United States Patent [19]

Tanaka et al.

[11] 4,354,298
[45] Oct. 19, 1982

[54] PEDAL COUPLING PIN

[75] Inventors: Yoshiyuki Tanaka; Masaharu Kobori, both of Yokohama, Japan

[73] Assignees: Nissan Jidosha Kabushiki Kaisha; Kato Hatsujo Kabushiki Kaisha, both of Kanagawa, Japan

[21] Appl. No.: 106,461

[22] Filed: Dec. 26, 1979

[30] Foreign Application Priority Data

Dec. 27, 1978 [JP] Japan .................. 53-182410[U]

[51] Int. Cl.³ .................. E05C 13/02; F16B 13/04
[52] U.S. Cl. .................. 24/201 LP; 24/208 A; 24/213 R; 24/291; 292/327
[58] Field of Search .................. 24/201 LP, 213, 214, 24/289, 291, 327, 306, 208 A; 292/327; 411/44, 509

[56] References Cited

U.S. PATENT DOCUMENTS

| | | | |
|---|---|---|---|
| 1,131,085 | 3/1915 | Reilly | 292/327 |
| 1,512,632 | 10/1924 | O'Connor | 292/327 |
| 3,092,175 | 6/1963 | Suessle | 24/214 |
| 3,768,849 | 10/1973 | Sytko | 292/327 |
| 3,777,052 | 12/1973 | Fegen | 24/208 A |
| 4,122,583 | 10/1978 | Grittner et al. | 24/213 R |

FOREIGN PATENT DOCUMENTS

| | | | |
|---|---|---|---|
| 1111742 | 3/1956 | France | 24/213 R |
| 1491023 | 8/1967 | France | 411/509 |

Primary Examiner—Victor N. Sakran
Attorney, Agent, or Firm—Koda and Androlia

[57] ABSTRACT

A pedal coupling pin for rotatably coupling a coupling member to a pedal including a cylindrical portion, a flange whose diameter is greater than the diameter of a coupling pin insertion holes formed in the coupling part, said flange being provided on one end of the cylindrical portion and an elastic retaining member provided on another end of the cylindrical portion. The elastic retaining member includes at least one pair of arms which extend outwardly toward the flange end and whose free ends extend outwardly a distance greater than the diameter of the coupling pin insertion holes.

1 Claim, 6 Drawing Figures

PEDAL COUPLING PIN

BACKGROUND OF THE INVENTION

1. Field of the Invention

Coupling pins and more particularly to coupling pins suitable for coupling brake pedals, clutch pedals, etc.

2. Prior Art

Referring to FIG. 1, shown therein is a conventional design for a brake pedal assembly. In FIG. 1, the brake pedal assembly includes a brake pedal 1 which is mounted on the vehicle body by means of a pin 2 so that the brake pedal 1 is free to rotate about the pin 2. A master cylinder 3 is fastened to the vehicle body 4 and a push rod 5 of the master cylinder 3 projects toward the brake pedal 1. A clevis 6, which acts as a coupling part is fastened to one end of the push rod 5.

In addition, a hole is drilled through an intermediate part of the brake pedal 1 and through the clevis 6. A coupling pin 7 is inserted through these holes. As is shown in FIGS. 2 and 3, a flange 7a whose diameter is greater than the diameters of the coupling pin insertion holes 8 in the brake pedal 1 and clevis 6 is formed on one end of the coupling pin 7. Also, a hole 9 is formed through other end of the coupling pin 7 in a radial direction. The pin 7 is inserted flangeless end first through the pin insertion holes 8 and is held in place by inserting a pin spring 10 through the hole 9 on the outside of the clevis 6. In this way, the coupling pin 7 is prevented from slipping out. As is shown in FIG. 3, the pin spring 10 is formed from a single piece of wire and consists of a straight portion 10a and a bent portion 10b. The straight portion 10a of of the pin spring 10 is inserted through the hole 9 and the resilience of the bent portion 10b of the pin spring 10 is utilized to hold the bent portion 10b against the surface of the coupling pin 7 so that the pin spring 10 is prevented from slipping out. As a result, the coupling pin 7 is prevented from slipping out.

However, when such means are used in order to fasten the coupling pin 7 in place, there is some danger of an accident ocurring due to improper insertion of the pin spring 10, failure to insert the pin spring or slipping out of the pin spring, etc., during assembly. Furthermore, there is also some danger of the pin spring slipping out or being damaged as a result of vibration during operation of the vehicle with the result of the coupling pin slips out and renders the brake pedal useless.

SUMMARY OF THE INVENTION

Accordingly, it is a general object of the present invention to provide a pedal coupling pin which can be easily inserted and requires no additional elements to prevent it from slipping out.

It is another object of the present invention to provide a pedal coupling pin which requires no other action to prevent it from slipping out except inserting it through the insertion holes.

In keeping with the principles of the present invention, the objects are accomplished by a unique pedal coupling pin for rotatably coupling a coupling member to a pedal. The pedal coupling pin includes a cylindrical portion, a flange whose diameter is greater than the diameter of coupling pin insertion holes formed in the coupling part provided on one end of the cylindrical portion and an elastic retaining member provided on an other end of the cylindrical portion. The elastic retaining member includes at least one pair of arms which extend toward the flanged end and outwardly and whose free ends extend outwardly from the other end a distance greater than the diameter of the coupling pin insertion holes.

BRIEF DESCRIPTION OF THE DRAWINGS

The above mentioned features and objects of the present invention will become more apparent with reference to the following description taken in conjunction with the accompanying drawings, wherein like reference numerals denote like elements and in which.

DETAILED DESCRIPTION OF THE INVENTION

Figure 1:
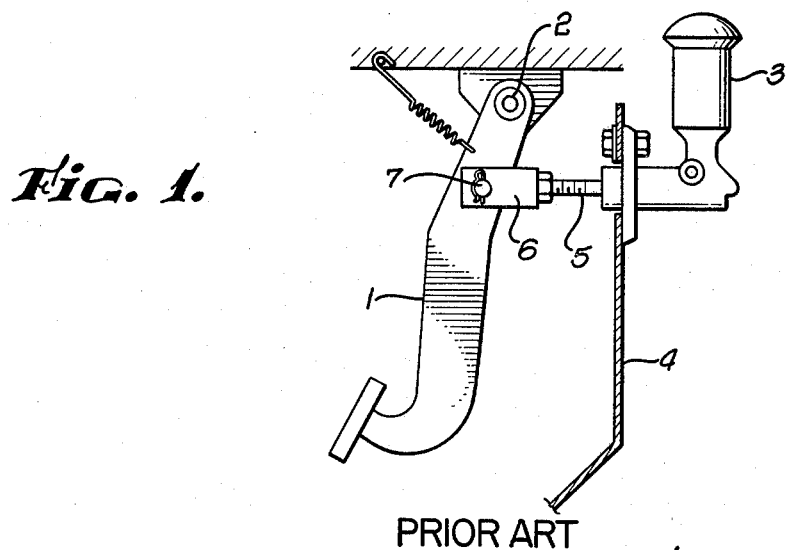
FIG. 1 is a side view illustrating a prior art brake pedal assembly.
Figure 2:
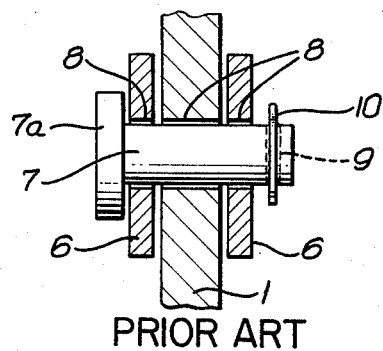
FIG. 2 is a magnified cross-sectional view of FIG. 1 which illustrates the essential parts of a prior art design.
Figure 3:
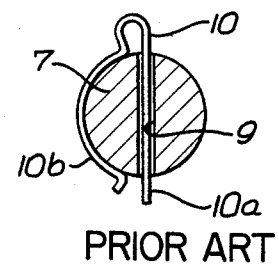
FIG. 3 is a cross-sectional view of a prior art coupling pin.
Figure 4A:
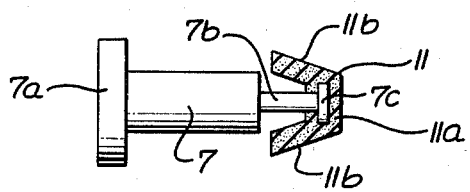
FIG. 4(A) is a partial cross-sectional view illustrating one embodiment of the present invention.
Figure 4B:
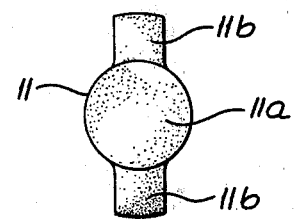
FIG. 4(B) is a front view of the retaining part shown in FIG. 4(A)
Figure 5:
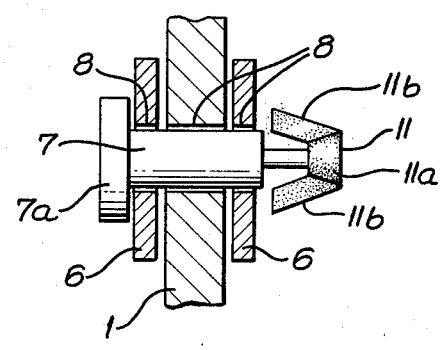
FIG. 5 is a cross-sectional front view illustrating the assembly of the embodiment of FIG. 4 (A).

Referring more particularly to the drawings, shown in FIGS. 4A, and 4B and 5 is one embodiment of the present invention. Those elements of FIGS. 4A, and 4B and 5 which are the same as those in FIGS. 1 through 3 are given like reference numerals and a description of their construction and operation will be omitted.

In this embodiment, a small-diameter shaft 7b is provided on the pin 7 so that it projects from the end of the coupling pin 7 opposite the flange 7a. Furthermore, a projecting part 7c formed in the shape of a circular plate is formed on the tip of the shaft 7b. A retaining part 11 made of plastic is integrally molded on the projecting part 7c. The diameter of the head 11a of the retaining part 11 is the same as the diameter of the coupling pin 7. Two arms 11b are integrally formed on opposite sides of the retaining part 11 so that the arms 11b open outwardly from the head 11a toward the flange 7a. The distance between the ends of the arms 11b is greater than the diameter of the pin insertion holes 8 for the coupling pin 7.

As is shown in FIG. 5, when a coupling pin 7 of the present invention is inserted retaining part 11 first through the coupling pin insertion holes 8 in the brake pedal 1 and clevis 6, the coupling pin 7 moves through the holes 8 with the arms 11b of the retaining part 11 elastically deformed inwardly. When the arms 11b move out of the clevis 6, their own resilience causes them to open outwardly. As a result, the coupling pin 7 cannot be pulled out. Therefore, even if the coupling pin 7 is subjected to vibration, etc., during operation of the vehicle, there is no danger that the coupling pin 7 will slip out and therefore, no danger of a resulting serious accident exists.

Furthermore, the number of arms 11b formed on the retaining part 11 is not limited to two; however, it should be clear that as long as there are at least two arms, any number of arms may be provided. Furthermore, in this embodiment, the retaining part 11 is used instead of a pin spring. However, in cases where double safety is required, it would also be possible to use the present invention in combination with the pin spring 10.

Furthermore, it would also be possible to weld steel leaf springs to the coupling pin in order to form a retaining part.

As is clear from the above description, the present invention uses a design in which an elastic retaining part made of plastic, etc. is fastened to the tip of the coupling pin 7 and the free ends of the arms 11b which branch out from the retaining part 11 anchor the coupling pin in place. Accordingly, the present invention provides a pedal coupling pin 7 whose mere insertion is all that is needed in order to prevent the coupling pin from slipping out and which makes one-touch coupling pin installation possible and which thus possesses advantages in terms of the number of assembly steps required.

It should be apparent to those skilled in the art that the above-described embodiment is but one of the many possible specific embodiments which represent the application of the principles of the present invention. Numerous and varied other arrangements can be readily devised by those skilled in the art without departing from the spirit and scope of the invention.

We claim:

1. A pedal coupling pin to be inserted through coupling pin insertion holes in a coupling member and a pedal for rotatably coupling said coupling member to said pedal comprising:

a pin portion made from metal, said pin portion comprising:
  a cylindrical portion;
  a flange whose diameter is greater than a diameter of said coupling pin insertion holes formed in the coupling member, said flange being provided on one end of the cylindrical portion;
  a small diameter shaft projecting from the other end of said cylindrical portion; and
  a circular plate provided on the end of said small diameter shaft; and an elastic retaining member made from plastic provided on the circular plate, said retaining member comprising a head portion whose diameter is substantially the same as the diameter of said cylindrical portion integrally molded on said circular plate and at least one pair of resilient arms molded integrally with said head portion which extend outwardly toward the flange end and whose free ends extend outwardly a distance greater than the diameter of the coupling pin insertion holes whereby said pedal coupling pin may be installed by inserting it through said coupling pin insertion holes and retained in position only by said flange and said elastic retaining member.

* * * * *